United States Patent [19]

Takeuchi

[11] Patent Number: 4,759,373
[45] Date of Patent: Jul. 26, 1988

[54] ULTRASONIC PULSE DOPPLER APPARATUS

[75] Inventor: Yasuhito Takeuchi, Tokyo, Japan

[73] Assignee: Yokogawa Medical Systems, Limited, Tokyo, Japan

[21] Appl. No.: 57,969

[22] PCT Filed: Sep. 26, 1986

[86] PCT No.: PCT/JP86/00495

§ 371 Date: May 18, 1987

§ 102(e) Date: May 18, 1987

[87] PCT Pub. No.: WO87/01925

PCT Pub. Date: Apr. 9, 1987

[30] Foreign Application Priority Data

Sep. 27, 1985 [JP] Japan .............................. 60-213789

[51] Int. Cl.$^4$ ............................................. A61B 10/00
[52] U.S. Cl. ................................... 128/663; 73/861.25
[58] Field of Search ..................... 128/663; 73/861.25; 367/90, 103–104

[56] References Cited

U.S. PATENT DOCUMENTS

| | | | |
|---|---|---|---|
| 4,182,173 | 1/1980 | Papadofrangakis et al. | 128/663 X |
| 4,509,525 | 4/1985 | Seo | 128/663 |
| 4,598,589 | 7/1986 | Riley | 367/90 X |
| 4,598,716 | 7/1986 | Hileman | 128/663 |
| 4,640,292 | 2/1987 | Tykulsky et al. | 128/663 X |

Primary Examiner—Francis J. Jaworski
Attorney, Agent, or Firm—Moonray Kojima

[57] ABSTRACT

An ultrasonic pulse Doppler apparatus has: range gate (20) for separately performing range-gating of the respective received ultrasonic echo signals of the oscillation elements of an ultrasonic probe (1) each time the signals are respectively adjusted in correspondence with the direction of a received ultrasonic beam; pulse stretcher filter (21) for extending the duration of the respective plurality of range-gated received signals while storing the energy of the signals; phasing/adding stage (7a) for matching the phases of a plurality of output signals from the pulse stretcher filter and performing addition thereof; detection portion (12) for effecting coherent detection of an output signal from said phasing/adding stage; and Doppler signal generating components (15, 16) for respectively generating Doppler signals on the basis of an output signal from the detection portion.

The received echo signal of each of the oscillation elements is range-gated, and the duration of the respective range-gated signals is extended by the pulse stretcher filter. Subsequently, the signals are matched in phase and added. Accordingly, the level of the received signal hardly reaches the limit of the dynamic range of a signal processing circuit employed.

2 Claims, 6 Drawing Sheets

Usable Section

ULTRASONIC PULSE DOPPLER APPARATUS

DESCRIPTION

1. Technical Field

The present invention relates to a pulse Doppler apparatus of a phased array system usable as medical ultrasonic equipment or a short-range sonar, and more particularly to an improvement in a method of forming a received ultrasonic beam.

2. Background Art

A conventional type of phased-array Doppler apparatus is normally provided in a form capable of being also used as and combined with a B-mode imaging device. Therefore, not only a probe but an initial-stage amplifier and a received-beam former (referred to also as "phase converter") are commonly used for the purpose of both imaging and Doppler processings.

FIG. 8 shows an example of a apparatus of this conventional type. As shown in FIG. 8, an array probe 1 is driven by a pulse at a high voltage supplied by a transmitter/receiver circuit group 2, and transmits ultrasonic waves into a body organ. The transmitter/receiver circuit group includes high-voltage pulse generating circuits each corresponding to each element of the probe 1. The respective high-voltage pulse generating circuits are driven by a plurality of outputs from a transmitted-beam former 3. The transmitted-beam former 3 receives an output trigger pulse from a transmission trigger circuit 4, and outputs a plurality of output signals which are appropriately time-delayed, respectively. The transmission trigger circuit 4 is triggered by a signal obtained by dividing the frequency of a clock of a clock generator 6 by means of a frequency divider 5.

The probe 1 converts echoes from body organs into electrical signals, and outputs them. The echo signals converted into electrical signals pass through the initial-stage amplifiers of the transmitter/receiver circuit group 2, and are input to a received-beam former 7. In the received-beam former 7, after completion of phase matching, the echo signals are added and supplied as an output. This echo signal is supplied to a B-mode imaging echo filter 8 and a Doppler echo filter 9. The output from the echo filter 8 is passed through a logarithm compression RF amplifier 10, then detected by a detector 11 and supplied as a B-mode video signal. This video signal is input to a B-mode display device (not shown) on which a B-mode image display is produced.

The output from the Doppler echo filter 9 is conducted into a coherent detector 12 in which only a Doppler signal relative to a transmitted spectrum is extracted in response to 90° out-of-phase reference waves supplied from a phase converter 13. The phase converter 13 uses as a carrier a clock of the clock generator 6 and outputs 90° out-of-phase reference waves. The echo signal is divided into two channels by the coherent detector 12, and the echo signals through the respective channels are gated by a range gate 14. Subsequently, only a signal in an effective frequency range is extracted in a Doppler filter 15, and is subjected to a Nyquist filter 16.

The range gate 14 is a gate for selecting a Doppler signal from within a given sample volume belonging to an object depth, and a signal for controlling the gate is supplied by a range gate setter 17. The range gate setter 17 generates a range gate signal RG on the basis of an output from the transmission trigger circuit 4.

A Doppler AF signal output from the Nyquist filter 16 is supplied to a frequency analyzer (not shown), and is analyzed therein. The result of the analysis is displayed on a display device (not shown). Also, the Doppler AF signal can be directly monitored as an audio sound through a loudspeaker or the like.

Echoes containing a Doppler shift from body organs are extremely weak as compared with echoes containing no Doppler shift. Typically, echoes from a blood stream is about 30dB lower than echoes from a surrounding body tissue. The echoes from the blood stream are commonly superimposed on those from the surrounding body tissue. Therefore, in order to positively pick up the former echoes, the signal processing circuit employed requires a wide dynamic range and superior linearity.

In a conventional system, however, unwanted signal components, that is, large signal components containing no Doppler shift (referred to as "clutter") are matched in phase and added via a beam former. Therefore, there is a problem in that a received signal subjected to phase matching and addition may reach the limit of the dynamic range of the signal processing circuit.

Also, range gating is applied to the result obtained from phase matching and addition followed by coherent detection. Therefore, the control wave form of the gate and a gated result show a remarkably small duty ratio (1/30 to 1/300), and thus the dynamic range of the coherent detector becomes narrow accordingly. This gives rise to a problem in that the condition is unfavorable as compared with the case of CW Doppler signal processing in which the complete duration of a signal can be utilized (the duty ratio is 1.)

DISCLOSURE OF THE INVENTION

It is therefore an object of the present invention to provide an ultrasonic pulse Doppler apparatus in which a received signal hardly reaches the limit of the dynamic range of a signal processing circuit.

It is another object of the present invention to provide an ultrasonic pulse Doppler apparatus in which the dynamic range of a coherent detector is not narrowed.

In order to achieve these objects, the present invention provides an ultrasonic pulse Doppler apparatus including: range gate means (20) for separately performing range-gating of the respective received ultrasonic echo signals of the oscillation elements of an ultrasonic probe (1) each time the signals are respectively adjusted in correspondence with the direction of a received ultrasonic beam; pulse stretcher filter means (21) for extending the duration of the respective plurality of range-gated received signals while storing the energy of the signals; phasing/adding means (7a) for matching the phases of a plurality of output signals from the pulse stretcher filter means and performing addition thereof; detection means (12) for effecting coherent detection of an output signal from said phasing/adding means; and Doppler signal generating means (15, 16) for respectively generating Doppler signals on the basis of an output signal from the detection means.

BEST MODE FOR CARRYING OUT THE INVENTION

The preferred embodiment of the present invention will be described below in detail with reference to the accompanying drawings.

Figure 1:
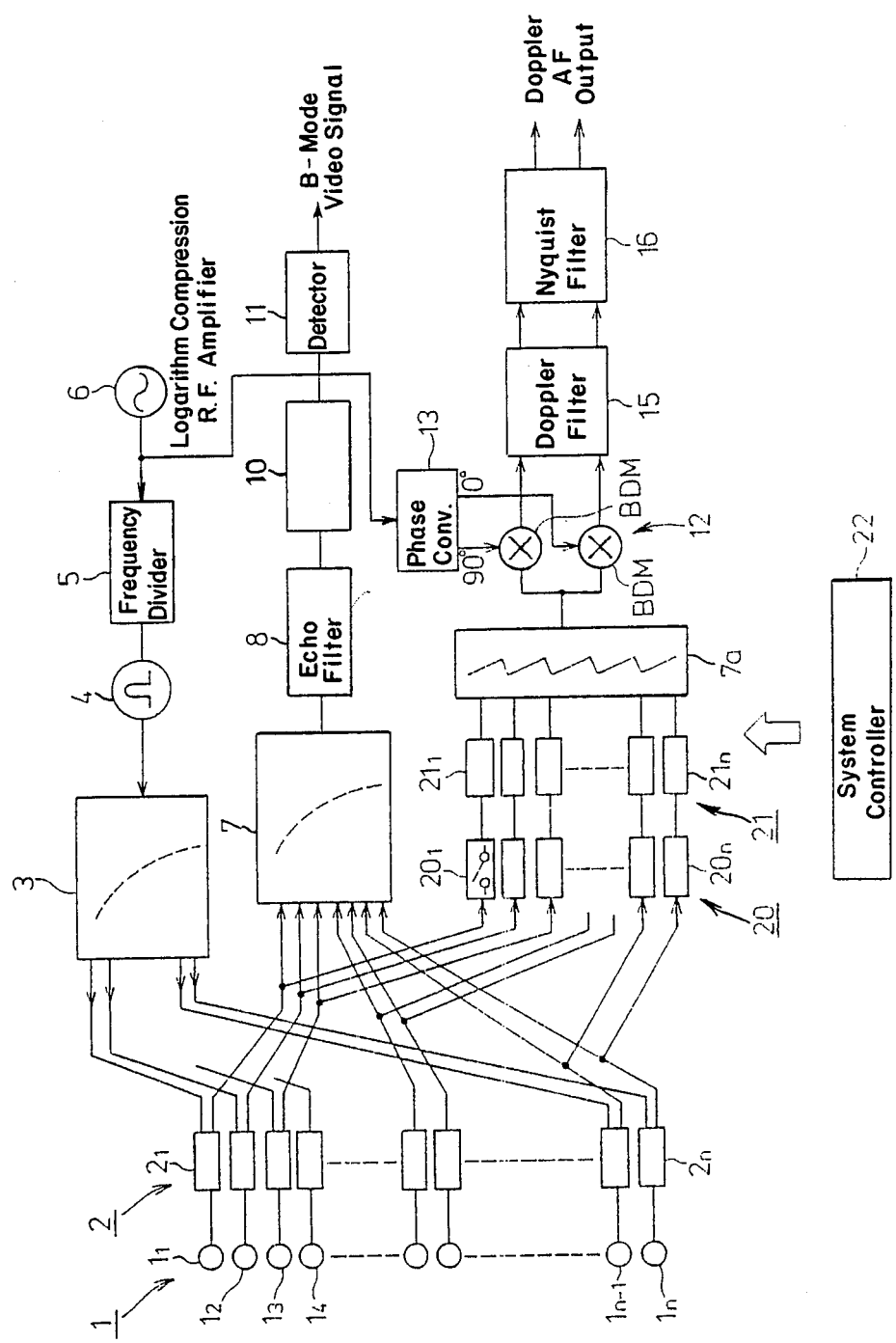
FIG. 1 is a block diagram of the essential portion of a preferred embodiment of an ultrasonic pulse Doppler apparatus in accordance with the present invention.
Figure 2:
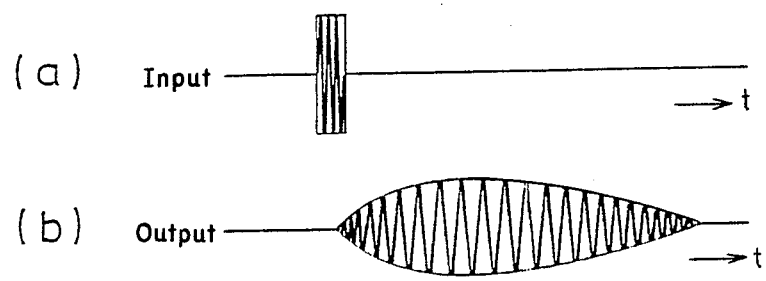
FIGS. 2(a), 2(b) and 3 are respectively graphs used as an aid in explaining the function of a pulse stretcher filter.
Figure 3:
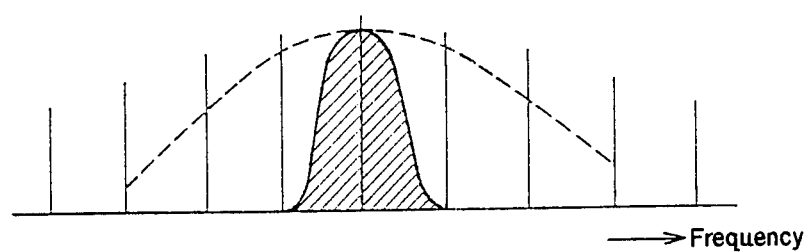
Figure 8:
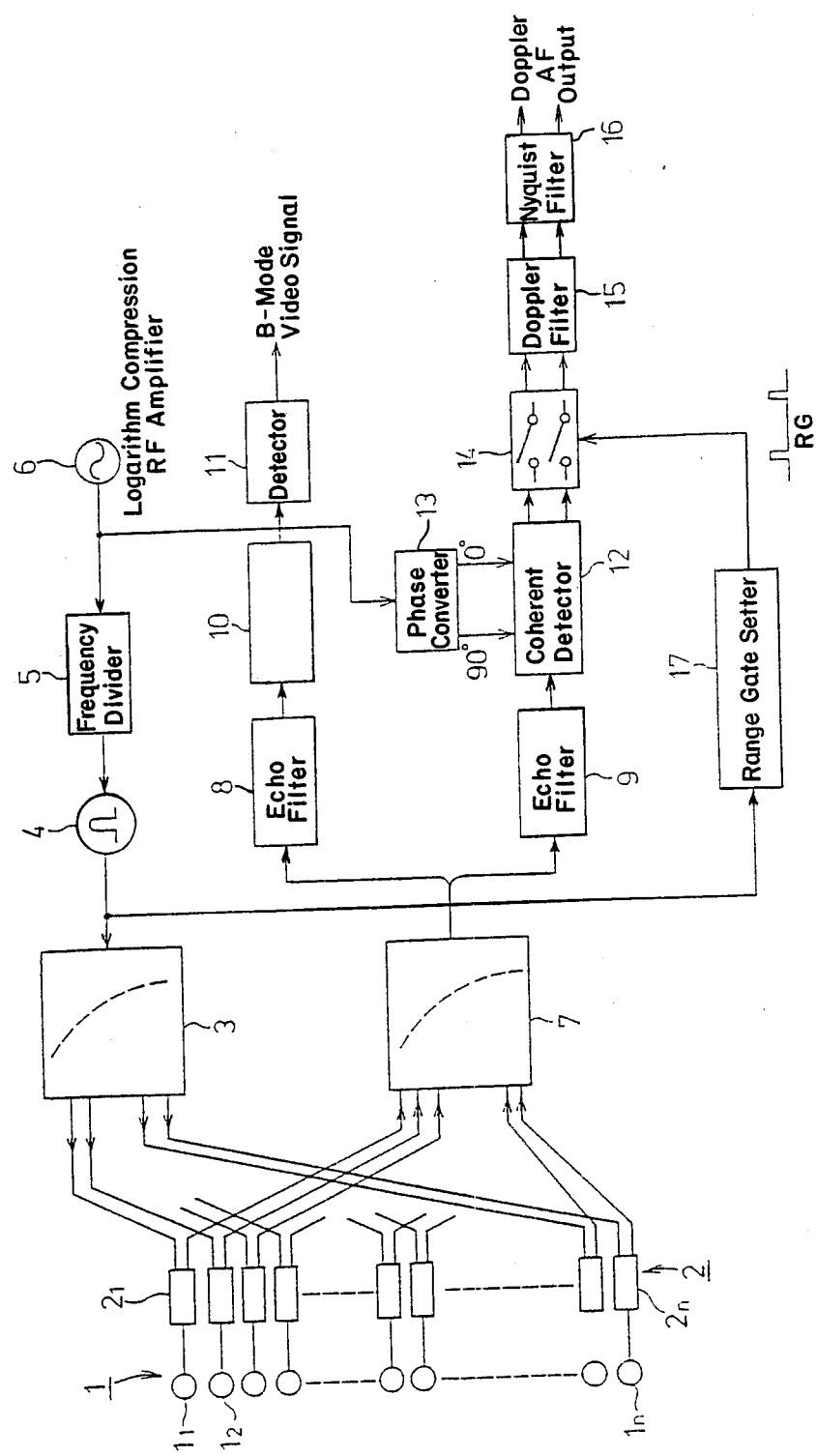
FIG. 8 is a block diagram of an example of an ultrasonic pulse Doppler apparatus of the prior art.

FIG. 1 is a diagram showing an embodiment of an ultrasonic pulse Doppler apparatus in accordance with the present invention. The embodiment differs from the prior-art apparatus shown in FIG. 8 in that a group of range gates are disposed forwards of a dedicated Doppler beam former and in that a group of stretcher filters are disposed rearwards of the range gates. In FIG. 1, the same reference numerals are used to identify the same components of the prior-art apparatus shown in FIG. 8. A group of range gates indicated generally at 20 include n-number of range gates which are separately disposed in correspondence with the respective elements of the probe 1. The respective echo signals passing through the range gates $20_1$ to $20_n$ are input to corresponding pulse stretcher filters $21_1$ to $21_n$. The respective outputs from the pulse stretcher filters $21_1$ to $21_n$ are phase-matched and added by a dedicated-Doppler type received beam former 7a. The respective pulse stretcher filters $21_1$ to $21_n$ are rounding-off filters (tuning circuits) for rounding off the envelopes of RF pulse signals. As shown in FIG. 2(a), when an RF burst signal (a) is input to the respective filters, the filters transform the wave form of the signal into that shown in FIG. 2(b) having a large duty ratio while storing the energy thereof. Such a filter may be constituted by a bandpass filter, for example, of any of LC, crystal, ceramic, and mechanical types. If the function of the pulse stretcher filter is considered from another viewpoint, as shown in FIG. 3, the filter serves to extract one bright line spectrum from a group of bright line spectra which are periodically observed on frequency axes. However, the function of the stretcher is not necessarily limited only to an extraction action realized within an extremely narrow range indicated by slanting lines. Even a stretcher having a wide range as shown by a broken line performs a satisfactory function in a substantial sense.

A system controller 22 is disposed so as to supply required control signals to the range gate group 20, the pulse stretcher filter group 21, the received beam former 7a and the like.

Figure 4A:
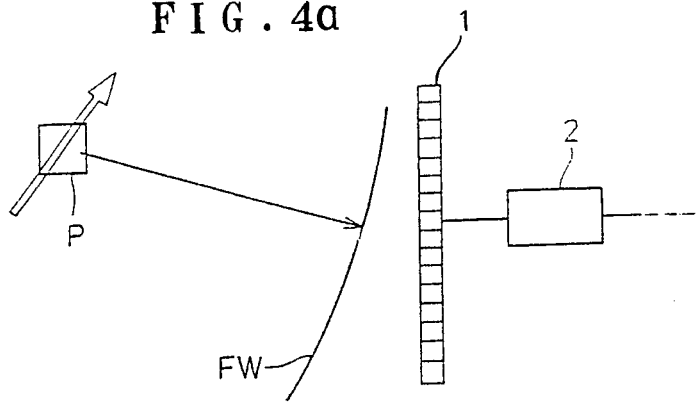
FIGS. 4a, 4b and 4c are respectively diagrams of the wave forms of respective portions used as an aid in explaining the operation of the embodiment.
Figure 4B:
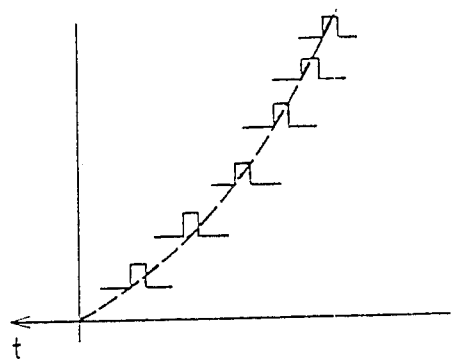
Figure 4C:
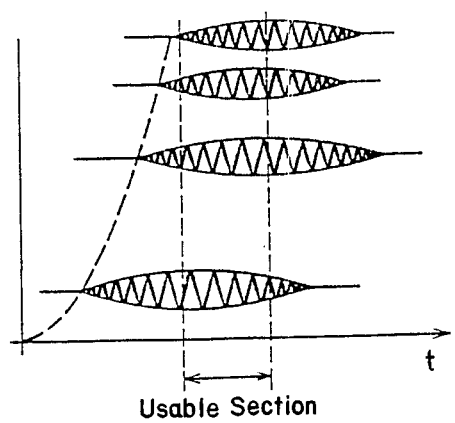

The operation of this arrangement will be described with specific reference to the Doppler apparatus. The moment of range-gating a signal received by each of the elements of the probe 1 is controlled by a system controller 22 so that the received signals are distributed along the time axis as shown in FIG. 4b in accordance with the manner of incidence of an object wave front FW propagating from an object point P, for example, as shown in FIG. 4a. Incidentally, in FIG. 4b, time elapses from right to left along the time axis. The received signals of the respective elements of the probe 1 which have been range-gated are passed through the corresponding pulse stretcher filters 21. The respective durations of the outputs from the pulse stretcher filters 21 are extended as shown in FIG. 4c. If consideration is given to a common usable section including all the signals in such a signal group, the phase difference between the respective signals in the usable section is in a range of ±180°. Therefore, phase adjustment for phase-matching and adding these signals can be performed in a range of ±180° irrespective of the timing of the range gate. This phase matching is performed by the received beam former 7a, and the signals are phase-matched and added and are output from the beam former 7a. The output is detected by the coherent detector 12. The coherent detector 12 may be constituted, for example, by two pairs of balanced demodulators (BDM).

In this manner, the range gate is disposed for the channel of each of the elements of the probe, and their opening and closing time is individually controlled. Therefore, the respective signal levels to be processed by the range gates are matched in phase and added, thereby being adjusted in such a manner that the amplitude is not increased. Accordingly, the risk of the received signals reaching the limit of the dynamic range of the signal processing circuit is further reduced as compared with the prior art. Also, after the received-beam signals from the respective elements have been subjected to range-gating, they are passed through narrow-band filters serving as a pulse stretcher. Therefore, the output from the pulse stretcher filters show a large duty ratio (that is, the peak factor is small), and thus can be handled by the coherent detector. The dynamic range of the coherent detector becomes equal to the case of handling CW Doppler signals.

Figure 5:
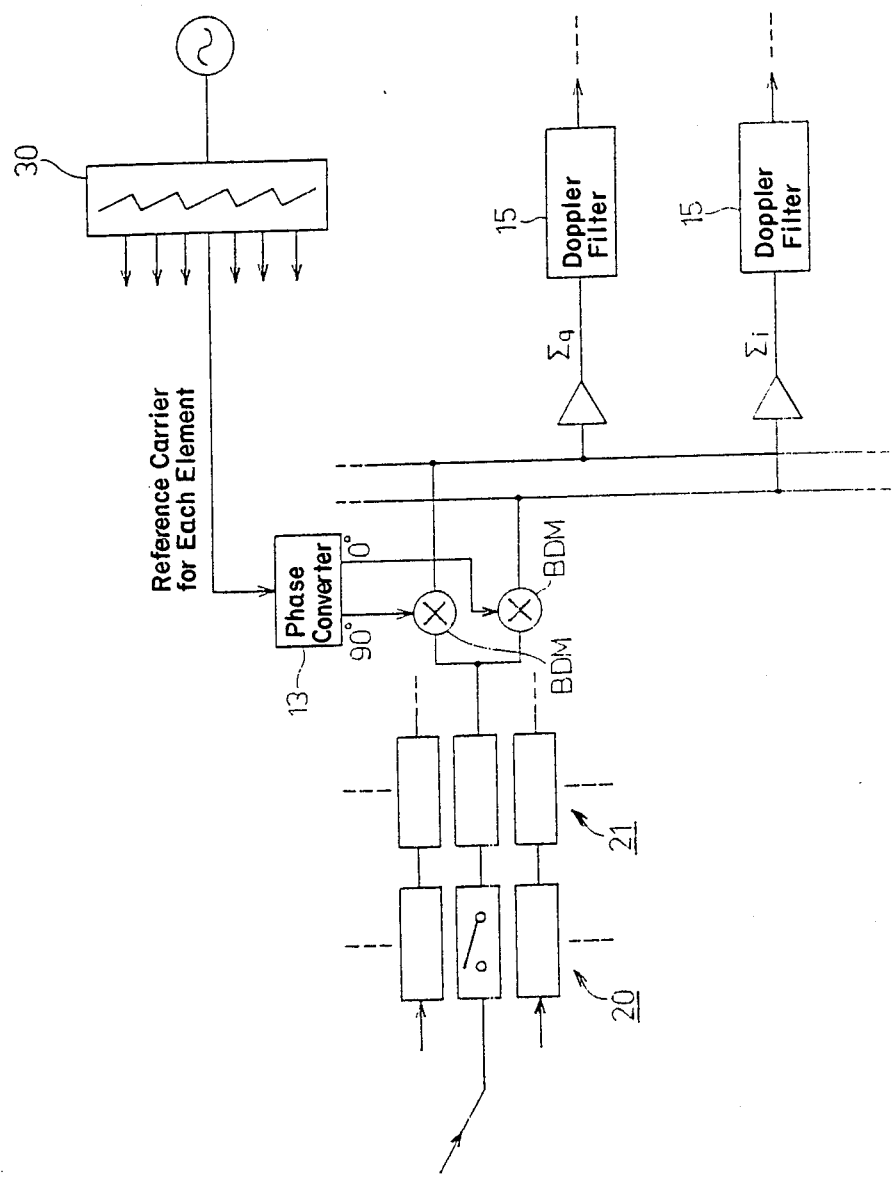
FIGS. 5, 6 and 7 are respectively block diagrams showing the essential portion of other embodiments of the present invention.

FIG. 5 is a block diagram of the construction of the essential portion of another embodiment of the present invention. Specifically, the respective outputs from the pulse stretcher filters $21_1$ to $21_n$ are subjected to coherent detection by the balanced demodulator BDM, and the respective groups of signals i and q are separately phase-matched and added. The phase matching is performed by adjusting the phase of a reference carrier at the time of coherent detection. A phase map 30 is disposed so as to generate a group of demodulating carriers, and, for example, a digital circuit made up of shift registers may be used for the phase map 30.

Figure 6:
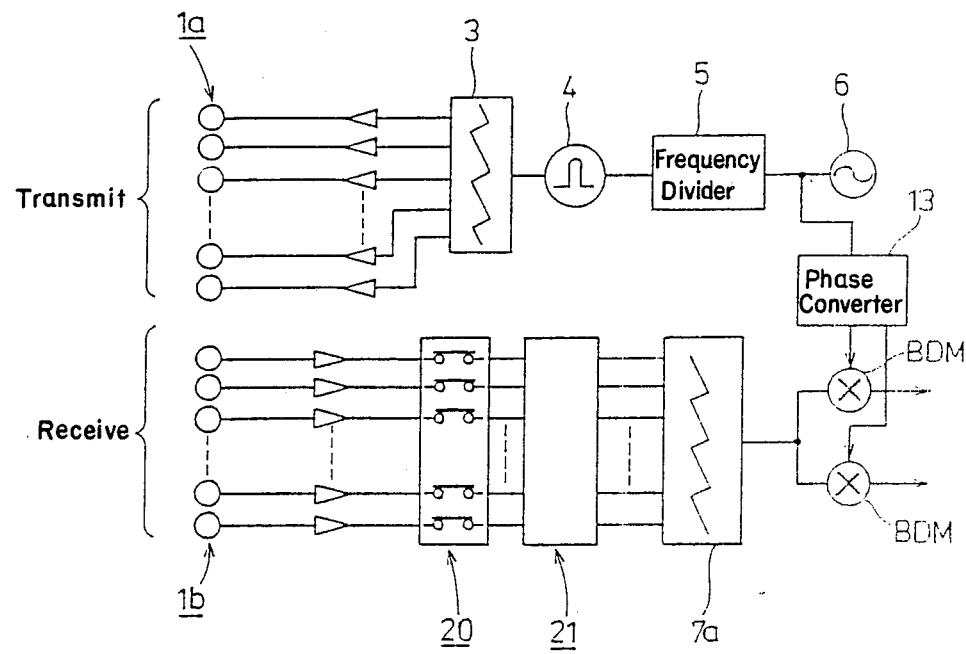

FIG. 6 is a block diagram of the construction of the essential portion of still another embodiment of the present invention. As viewed from another viewpoint, the system of the present invention contemplates shaping a pulse Doppler received signal into a CW Doppler type form or similar. In this sense, the present invention is well suited for a CW Doppler arrangement irrespective of whether or not the same array is used or another dedicated two-element probe is used. Specifically, if the respective range gates for the elements of the probe are normally maintained in a ON state at the time of wave reception and transmission of waves is performed by another transmitter or another portion of the same array, the arrangement of the invention can be easily changed to a CW Doppler arrangement. FIG. 6 shows this manner. In this case, although the function of the pulse stretcher filter 21 is not effectively utilized, it may be interposed in the circuit.

Figure 7:
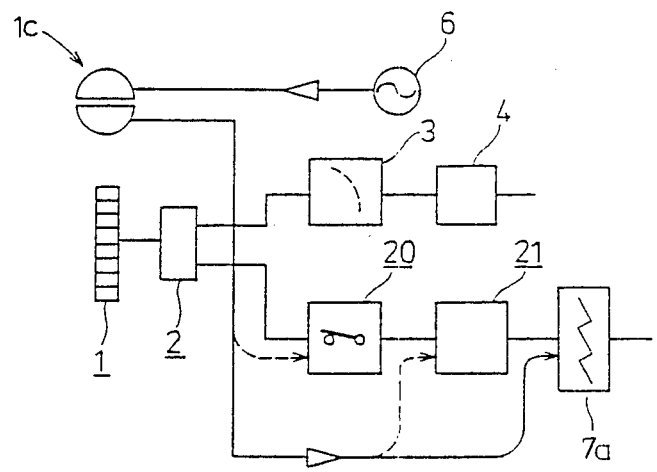

On the other hand, when another dedicated CW probe 1c is used as shown in FIG. 7, the CW signal from its reception element may be supplied forwards or rearwards of the pulse stretcher filter.

While the above provides a full disclosure of the best mode for carrying out the invention, for ordinary persons skilled in the technical field to which the present invention belongs, it is easy to produce various modifications and variations without departing from the true spirit and scope of the invention.

I claim:

1. An ultrasonic pulse Doppler apparatus comprising an ultrasonic probe (1) having an array of a plurality of oscillation elements for transmitting ultrasonic beams in a predetermined direction into an object under examination and for receiving echo signals from within said object;

drive means (2,3,4,5,6) for sequentially supplying to said respective plurality of oscillation elements a plurality of drive pulse signals having phases which correspond to the said direction of ultrasonic beams to be transmitted from the respective oscillation elements;

a plurality of gate means (20) connected to respective ones of said plurality of oscillation elements for effecting range gating on a wavefront of respective received echo signals from respective ones of said plurality of oscillation elements to provide range gated echo signals;

a plurality of pulse stretching filter means (21) connected to respective ones of said plurality of gate means for extending the time duration of the respective range gated received echo signals and for storing their energies and for producing a plurality of pulse stretched output signals;

phasing/adding means (7a) connected to said plurality of filter means for acting on all of the pulse stretched output signals from said filter means during a particular length of time common to all of said pulse stretched output signals to match phases of said plurality of pulse stretched output signals and for adding all thereof and for producing an output signal corresponding to said stretched output signals;

detection means (12) connected to said phasing/adding means for effecting coherent detection of said output signal from said phasing/adding means and for producing a detected output signal; and Doppler signal generating means connected to said detection means for generating a Doppler signal on the basis of said detected output signal from said detection means.

2. An ultrasonic pulse Doppler apparatus comprising an ultrasonic probe (1) having an array of a plurality of oscillation elements for transmitting ultrasonic beams in a predetermined direction into an object under examination and for receiving echo signals from within said object;

drive means (2,3,4,5,6) for sequentially supplying to said respective plurality of oscillation elements a plurality of drive pulse signals having phases which correspond to the said direction of ultrasonic beams to be transmitted from the respective oscillation elements;

a plurality of gate means (20) connected to respective ones of said plurality of oscillation elements for effecting range gating on a wavefront of respective received echo signals from respective ones of said plurality of oscillation elements;

a plurality of pulse stretching filter means (21) connected to respective ones of said plurality of gate means for extending the time duration of the respective range gated received echo signals and for storing their respective energies and for producing a plurality of pulse stretched output signals;

a plurality of detection means (13) for effecting coherent detection of a plurality of output signals from said pulse stretching filter means on the basis of reference signals having phases corresponding to the phases of respective output signals from said pulse stretching filter means and for producing detected output signals;

adding means for adding said detected output signals from said plurality of detection means and for producing added output signals; and Doppler signals generating means (15,16) for generating Doppler signals on the basis of said added output signals from said adding means.

* * * * *